J. C. BETHEA.

Plow.

No. 3,094. Reissued Aug. 25, 1868.

Witnesses:
G. W. Rothwell
S. C. Kemon

Inventor:
Munn & Co
Attys for
James C. Bethea
By O. Knight
Supt

N. PETERS, Photo-Lithographer, Washington, D. C.

UNITED STATES PATENT OFFICE.

JAMES C. BETHEA, OF BLAKELY, GEORGIA.

IMPROVEMENT IN PLOWS.

Specification forming part of Letters Patent No. 61,796, dated February 5, 1867; Reissue No. 3,094, dated August 25, 1868.

*To all whom it may concern:*

Be it known that I, JAMES C. BETHEA, of Blakely, in the county of Early and State of Georgia, have invented new and useful Improvements in Plows; and I do hereby declare the following to be a full, clear, and exact description of the same, reference being had to the accompanying drawings, and to the letters of reference thereon, forming a part of this specification, in which—

Figure 2:
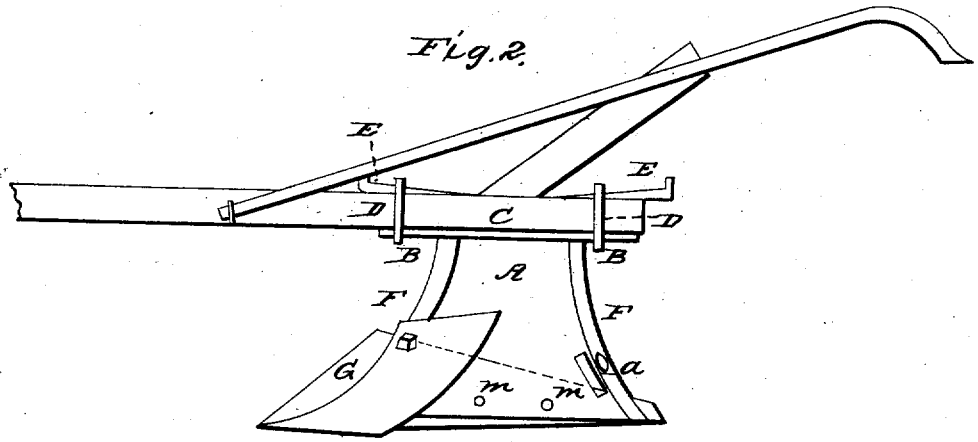
Figure 1:
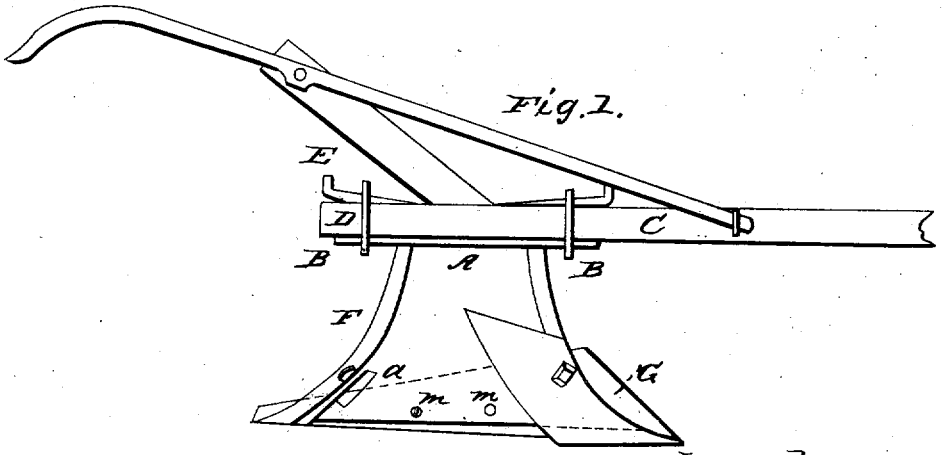

Figures 1 and 2 are elevations showing the plow arranged for right and left hands, respectively.

Similar letters denote the same parts in all the figures of the drawings.

Plows as constructed previous to my invention were either defective in that of the beam being weakened by a bolt that passed through it for drawing it down to the metal part below it, in that of not being drawn down to the metal part, but sidewise against it, leaving the beam's angle to the bottom of the plow subject to be varied, so that the depth of the furrow would be irregular, or in that of the part which surrounded the beam and a portion of the metal part below it being so far in rear of the front end of the beam and so near the rear end of the metal part below it that the front end of that part of the plow in the ground would rise and fall, and also vary to the right or left in respect to the beam's position, thereby varying the depth and width of the furrow, instead of keeping these the same as near as possible. By my invention these defects are obviated to a very great extent, if not entirely, and is done by having that portion of the metal standard or post A next the beam C projected both further forward and back than the vertical portion, as shown at B B, and making that part of the post on which the beam rests as wide as it is horizontally, and confining them together by the shackles or stirrups D D and the key-wedges E E, one stirrup surrounding the beam C and forward projection B and the other stirrup the beam and rear projection, while the beam is drawn tightly down to the post by the wedges E E. Thus arranged, the length of bearing of the beam on the post is not only increased over the former construction of the post, but the connection of the beam to it is made much further forward than by any other stirrup-connection which surrounded the beam and a portion of the post or metal part under the beam, and held them in connection. The beam, by being thus connected to the post, can have no perceivable variation in respect thereto, either up and down or sidewise, and therefore the depth and width of the furrow is kept the same. Were the rear stirrup not used, the beam's strength to withstand the upward strain brought upon it by the draft of the plow would not in any wise be affected, but without the rear stirrup or some equivalent therefor which would prevent the rear end of the beam from being moved to the right or left in respect to the post, the connection of the beam thereto would be less perfect than it now is, and a variation in the width of the furrow be a natural consequence.

I do not wish to be understood as claiming to be the first to conceive the idea of connecting the plow-beam to the post or metal part under it, and to which metal part the other parts in the ground are connected by a stirrup which surrounds the beam and a portion of the metal part below it for drawing the beam down to the metal part, as I am aware that such a stirrup was used prior to my invention, but only in place of my rear stirrup, leaving both the beam and metal part below it very weak, and liable to be broken by the part in the ground striking a stone, &c., by reason of the front stirrup not being used, and the lack of which left the front end of the beam variable to the right or left, in respect to the landside of the post; but I am not aware that a stirrup surrounding the beam, and a portion of the metal part below it, while a portion of this metal part was directly in rear of a portion of the stirrup, as is the case with my front stirrup, was ever known before my invention, and therefore I do not wish to be understood as limiting the use of this front stirrup to its particular construction or manner of being tightened up for drawing the parts toward each other, but to the use of the stirrup surrounding the beam and some portion of the metal below it, and having some portions of the standard or post directly behind the lower end or cross-bar thereof, so as to better hold the beam and post together, and give greater strength to both of them than can be done when no portion of the post is directly in rear of the lower end or cross-bar of this front stirrup.

The standard or post A, as shown in Figs. 1 and 2, is the same shape in front and rear, and has the same angle-flange F, at both the front and rear edge, for sustaining and holding the share and mold-board attached thereto by the screw-bolt and nut, as shown at *a*. By having the post A thus constructed, and a right and left hand share and mold-board go with it, the user of the plow can change it at will from a right to a left hand one by reversing the beam upon the post and attaching the proper share and mold-board.

The landside G, the front portion of which serves as a cutter to cut the furrow loose from the solid land, may be used the same with both the right and left share and mold-board, and it is so confined to the landside of the post by the screw-bolts *m m* as to bring its front end and cutting-edge in the same position in respect to each share and mold-board; but I wish it distinctly understood that the use of none of the parts named are limited to a plow constructed for turning the furrow to the right or left, as the user may choose. The plows or shares attached to the beam may be of any shape or kind desired.

What I claim as my invention is—

1. The post A, having in combination the front flange, F, and projection B, or any equivalent of this projection, which sustains in front of the vertical part of the post next below it the holding-down mechanism of the beam.

2. Making the connection of the plow-beam to the post A, having the front flange, F, by the stirrup D and wedge E, or equivalents of these two parts, the stirrup of which surrounds the beam and a portion of the metal below it, and has directly in rear of the lower end a portion of the post.

3. The post A, having the front flange, F, and projection B, or any equivalent of this projection, which, together with the beam, is surrounded by the stirrup D, and drawn together by the wedge E, or equivalents of this stirrup and wedge, which hold the beam to the post, as these parts do, without weakening either one.

4. The post A, having the front flange, F, and the front and rear projections, B B, or any equivalent of the front projection, which, together with the beam, is surrounded by the stirrup D, and drawn together by the wedge E, or equivalents of this stirrup and wedge, which hold the beam to the post in front, while the beam is so held to the rear flange as to prevent the parallelism of the landside of the beam and post being varied.

5. The combination of the post A, having the front flange, F, and projection B, and the stirrup D, wedge E, and landside G, with its cutting-edge, or an equivalent combination of parts.

6. The post A, having the front and rear flanges, F F, and projections B B, and the beam C, connected to the projections, with the stirrups D D and the wedges E E, or equivalents of these parts, for changing the plow from a right to a left hand turning one.

7. The combination of the reversible landside G with the post A, having the flanges F F.

To the above specification of my improvement in plows I hereunto set my hand this 25th day of May, A. D. 1868.

JAMES C. BETHEA.

Witnesses:

J. W. BETHEA,

S. WISE PARKER.